(12) United States Patent
Nakade et al.

(10) Patent No.: US 11,407,445 B2
(45) Date of Patent: Aug. 9, 2022

(54) ELECTRIC POWER STEERING SYSTEM

(71) Applicant: JTEKT CORPORATION, Osaka (JP)

(72) Inventors: Tomohiro Nakade, Sakurai (JP);
Robert Fuchs, Nara (JP)

(73) Assignee: JTEKT CORPORATION, Osaka (JP)

( * ) Notice: Subject to any disclaimer, the term of this patent is extended or adjusted under 35 U.S.C. 154(b) by 317 days.

(21) Appl. No.: 16/872,468

(22) Filed: May 12, 2020

(65) Prior Publication Data

US 2020/0377148 A1 Dec. 3, 2020

(30) Foreign Application Priority Data

May 27, 2019 (JP) .............................. JP2019-098617

(51) Int. Cl.
*B62D 6/00* (2006.01)
*B62D 5/04* (2006.01)

(52) U.S. Cl.
CPC ......... *B62D 5/0463* (2013.01); *B62D 5/0409* (2013.01); *B62D 5/0481* (2013.01)

(58) Field of Classification Search
CPC .. B62D 5/0463; B62D 5/0409; B62D 5/0481; B62D 6/007; B62D 1/286; B62D 15/025; B62D 5/04; B62D 5/046; B62D 6/00
USPC .......................................................... 701/41
See application file for complete search history.

(56) References Cited

U.S. PATENT DOCUMENTS

| | | | |
|---|---|---|---|
| 9,592,850 B1 * | 3/2017 | Kataoka | B62D 15/025 |
| 2015/0225018 A1 * | 8/2015 | Oya | B62D 5/0463 |
| | | | 701/41 |
| 2019/0329818 A1 * | 10/2019 | Shoji | B62D 6/002 |
| 2019/0375449 A1 * | 12/2019 | Takase | B62D 5/046 |
| 2021/0188252 A1 * | 6/2021 | Lu | B60W 40/12 |

FOREIGN PATENT DOCUMENTS

| | | |
|---|---|---|
| EP | 2913250 A2 | 9/2015 |
| JP | 2003-063437 A | 3/2003 |
| JP | 2018-183046 A | 11/2018 |

OTHER PUBLICATIONS

Oct. 20, 2020 Search Report issued in European Patent Application No. 20175722.6.

* cited by examiner

*Primary Examiner* — Shardul D Patel
(74) *Attorney, Agent, or Firm* — Oliff PLC (57) ABSTRACT

An electric power steering system includes an electric motor, a rotational angle detection unit, a current detection circuit, a steering torque detection unit, a target torque setting unit, a current command value setting unit, and a current control unit. The target torque setting unit includes a basic target torque setting unit, a first compensation value computation unit, a second compensation value computation unit, and a correction unit. The basic target torque setting unit sets basic target torque for the electric motor. The first compensation value computation unit sets a first compensation value based on steering torque. The second compensation value computation unit computes a second compensation value which is an estimated value of disturbance torque other than the steering torque. The correction unit corrects the basic target torque.

2 Claims, 5 Drawing Sheets

ELECTRIC POWER STEERING SYSTEM

CROSS-REFERENCE TO RELATED APPLICATION

This application claims priority to Japanese Patent Application No. 2019-098617 filed on May 27, 2019, incorporated herein by reference in its entirety.

BACKGROUND

1. Technical Field

The disclosure relates to an electric power steering system.

2. Description of Related Art

There is a known lane keeping travel control device that generates automatic steering torque for causing a vehicle to travel while keeping a travel lane by estimating and feeding back a state amount about the travel state of the vehicle. As this type of lane keeping travel control device, a device is proposed that suppresses degradation in the lane keeping performance due to disturbance torque by estimating and feeding back disturbance torque applied to a steering system as a state amount about the travel state of the vehicle. If the disturbance torque is fed back, however, steering torque applied by a driver is also fed back as the disturbance torque to be canceled out even when the driver intentionally intervenes in steering, which makes it difficult for the driver to intervene in steering.

In order to address such an issue, Japanese Patent Application Publication No. 2003-63437 (JP 2003-63437 A) discloses a lane keeping travel control device in which disturbance torque applied to a steering system is divided into a high frequency component and a low frequency component to be estimated by an observer, and the high frequency component and the low frequency component are fed back by a regulator such that a feedback gain of the high frequency component of the disturbance torque is smaller than a feedback gain of the low frequency component. With the lane keeping travel control device according to JP 2003-63437 A, when the driver intervenes in steering during lane keeping travel, the result of estimating the high frequency component of the disturbance torque is increased by the steering torque while the feedback component is reduced, which makes it easy for the driver to intervene in steering.

SUMMARY

The disclosure makes it possible to change the degree of priority given to a system and a driver, and enables cooperation between the driver and the system.

An aspect of the disclosure provides an electric power steering system. The electric power steering system includes: an electric motor configured to apply motor torque to a steering system; a rotational angle detection unit configured to detect a rotational angle of the electric motor; a current detection circuit configured to detect a motor current that flows through the electric motor; a steering torque detection unit configured to detect or estimate steering torque applied to the steering system; a target torque setting unit configured to set target torque for the electric motor based on an automatic steering angle command value; a current command value setting unit configured to set a current command value corresponding to the target torque; and a current control unit configured to cause the motor current to follow the current command value. The target torque setting unit includes a basic target torque setting unit, a first compensation value computation unit, a second compensation value computation unit, and a correction unit. The basic target torque setting unit is configured to set basic target torque for the electric motor such that the rotational angle of the electric motor follows the automatic steering angle command value. The first compensation value computation unit is configured to set a first compensation value based on the steering torque. The second compensation value computation unit is configured to compute a second compensation value based on the motor torque, the rotational angle, and the steering torque, or the target torque. The second compensation value is an estimated value of disturbance torque other than the steering torque that acts on the steering system. The correction unit is configured to correct the basic target torque using the first compensation value and the second compensation value.

In the configuration described above, an estimated value of disturbance torque other than the steering torque that acts on the steering system is computed as the second compensation value, and used as a compensation value for the basic target torque. Thus, a reduction in the lane keeping performance during automatic steering due to the disturbance torque can be suppressed. On the other hand, the first compensation value is computed based on the steering torque which is applied to the steering system. Thus, suitable tactile information can be provided to the driver. For example, control in which priority is given to the system and inputs by the driver are ignored is achieved if the steering torque is set, as it is, as the first compensation value, and control in which inputs by the driver are received is achieved if a value with an absolute value that is smaller than the steering torque is set as the first compensation value. In this manner, the degree of priority given to the system and the driver can be changed by adjusting the first compensation value, which enables cooperation between a human (driver) and the system.

In the electric power steering system, the first compensation value computation unit may include a weight setting unit that sets a weight and a multiplication unit that computes the first compensation value by multiplying the steering torque by the weight.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
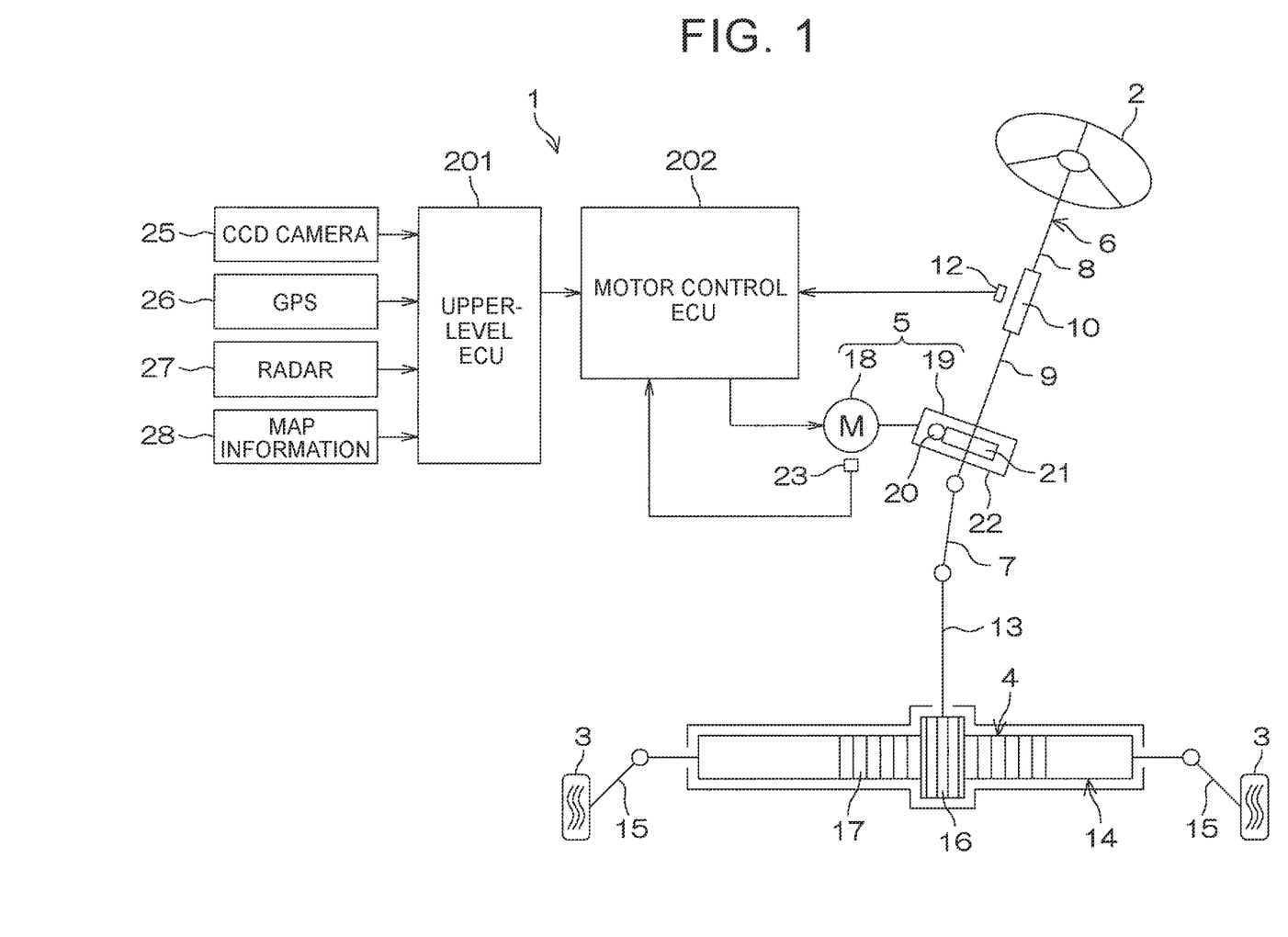
FIG. 1 is a schematic diagram illustrating a schematic configuration of an electric power steering system according to an embodiment of the disclosure.

An embodiment of the disclosure will be described in detail below with reference to the accompanying drawings. FIG. 1 is a schematic diagram illustrating a schematic configuration of an electric power steering system according to an embodiment of the disclosure. An electric power steering system 1 includes a steering wheel 2 that serves as a steering member used to steer a vehicle, a steering mechanism 4 that operates in conjunction with rotation of the steering wheel 2 to steer steered wheels 3, and a steering assist mechanism 5 that assists a driver in steering. The steering wheel 2 and the steering mechanism 4 are mechanically coupled to each other via a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled to each other so as to be relatively rotatable via a torsion bar 10. A torque sensor 12 is disposed in the vicinity of the torsion bar 10. The torque sensor 12 detects torsion bar torque $T_{tb}$ applied to the torsion bar 10 based on the amount of relative rotational displacement between the input shaft 8 and the output shaft 9. In this embodiment, the torsion bar torque $T_{tb}$ which is detected by the torque sensor 12 is detected as a positive value when the vehicle is steered to the left, and as a negative value when the vehicle is steered to the right, for example, and the magnitude of the torsion bar torque $T_{tb}$ is larger as the absolute value of the positive or negative value is larger. The torsion bar torque $T_{tb}$ is an example of "steering torque applied to the steering system" according to the disclosure.

The steering mechanism 4 is composed of a rack-and-pinion mechanism that includes a pinion shaft 13 and a rack shaft 14 that serves as a steered shaft. The steered wheels 3 are coupled to respective end portions of the rack shaft 14 via tie rods 15 and knuckle arms (not illustrated). The pinion shaft 13 is coupled to the intermediate shaft 7. The pinion shaft 13 is rotated in conjunction with a steering operation of the steering wheel 2. A pinion 16 is coupled to the distal end of the pinion shaft 13.

The rack shaft 14 extends linearly along the right-left direction of the vehicle. A rack 17 meshed with the pinion 16 is formed at an intermediate portion of the rack shaft 14 in the axial direction. The pinion 16 and the rack 17 convert rotation of the pinion shaft 13 into axial movement of the rack shaft 14. The steered wheels 3 can be steered by moving the rack shaft 14 in the axial direction.

When the steering wheel 2 is operated (rotated), rotation of the steering wheel 2 is transferred to the pinion shaft 13 via the steering shaft 6 and the intermediate shaft 7. Then, rotation of the pinion shaft 13 is converted into axial movement of the rack shaft 14 by the pinion 16 and the rack 17. Consequently, the steered wheels 3 are steered. The steering assist mechanism 5 includes an electric motor 18 that generates a steering assist force (assist torque), and a speed reducer 19 that amplifies and transfers output torque of the electric motor 18 to the steering mechanism 4. The speed reducer 19 is composed of a worm gear mechanism that includes a worm gear 20 and a worm wheel 21 meshed with the worm gear 20. The speed reducer 19 is housed in a gear housing 22 that serves as a transfer mechanism housing. In the following, the speed reduction ratio (gear ratio) of the speed reducer 19 is occasionally represented as N. The speed reduction ratio N is defined as the ratio $(\theta_{wg}/\theta_{ww})$ of a worm gear angle $\theta_{wg}$, which is the rotational angle of the worm gear 20, to a worm wheel angle $\theta_{ww}$, which is the rotational angle of the worm wheel 21.

The worm gear 20 is rotationally driven by the electric motor 18. In addition, the worm wheel 21 is coupled so as to be rotatable together with the output shaft 9. When the worm gear 20 is rotationally driven by the electric motor 18, the worm wheel 21 is rotationally driven, which applies motor torque to the steering shaft 6 and rotates the steering shaft 6 (output shaft 9). Then, rotation of the steering shaft 6 is transferred to the pinion shaft 13 via the intermediate shaft 7. Rotation of the pinion shaft 13 is converted into axial movement of the rack shaft 14. Consequently, the steered wheels 3 are steered. That is, the worm gear 20 is rotationally driven by the electric motor 18, which enables steering assist by the electric motor 18 and steering of the steered wheels 3. The electric motor 18 is provided with a rotational angle sensor 23 that detects the rotational angle of a rotor of the electric motor 18.

Examples of torque applied to the output shaft 9 (an example of a target to be driven by the electric motor 18) include motor torque applied by the electric motor 18 and disturbance torque $T_{lc}$ other than the motor torque. The disturbance torque $T_{lc}$ includes the torsion bar torque $T_{tb}$, road surface load torque (road surface reaction force torque) $T_{rl}$, friction torque $T_f$ generated in the speed reducer 19, etc. The torsion bar torque $T_{tb}$ is torque applied from the steering wheel 2 side to the output shaft 9 by a force applied by the driver to the steering wheel 2, a force generated by the steering inertia, etc.

The road surface load torque $T_{rl}$ is torque applied from the steered wheels 3 side to the output shaft 9 via the rack shaft 14 by self-aligning torque generated in the tires, a force generated by the suspensions and tire wheel alignment, the friction force of the rack-and-pinion mechanism, etc. The vehicle includes, as mounted thereon, a charge couple device (CCD) camera 25 that captures an image of a road ahead of the vehicle in the advancing direction, a global positioning system (GPS) 26 that detects the position of the vehicle, a radar 27 that detects the road shape and an obstacle, and a map information memory 28 that stores map information.

The CCD camera 25, the GPS 26, the radar 27, and the map information memory 28 are connected to an upper-level electronic control unit (ECU) 201 that performs drive assist control and automatic drive control. The upper-level ECU 201 performs surrounding environment recognition, vehicle position estimation, route planning, etc. based on information obtained by the CCD camera 25, the GPS 26, and the radar 27 and the map information, and determines control target values for steering and drive actuators.

In this embodiment, the upper-level ECU 201 sets a target automatic steering angle $\theta_{c,cmda}$ for automatic steering. In this embodiment, automatic steering control is control for causing the vehicle to travel along a target track, for example. The target automatic steering angle $\theta_{c,cmda}$ is a target value for the steering angle for causing the vehicle to automatically travel along the target track. The process of setting such a target automatic steering angle $\theta_{c,cmda}$ is well-known, and therefore is not described in detail herein.

The target automatic steering angle $\theta_{c,cmda}$, which is set by the upper-level ECU 201, is provided to a motor control ECU 202 via an in-vehicle network. The torsion bar torque $T_{tb}$, which is detected by the torque sensor 12, and an output signal from the rotational angle sensor 23 are input to the motor control ECU 202. The motor control ECU 202 controls the electric motor 18 based on such input signals and information provided from the upper-level ECU 201.

Figure 2:
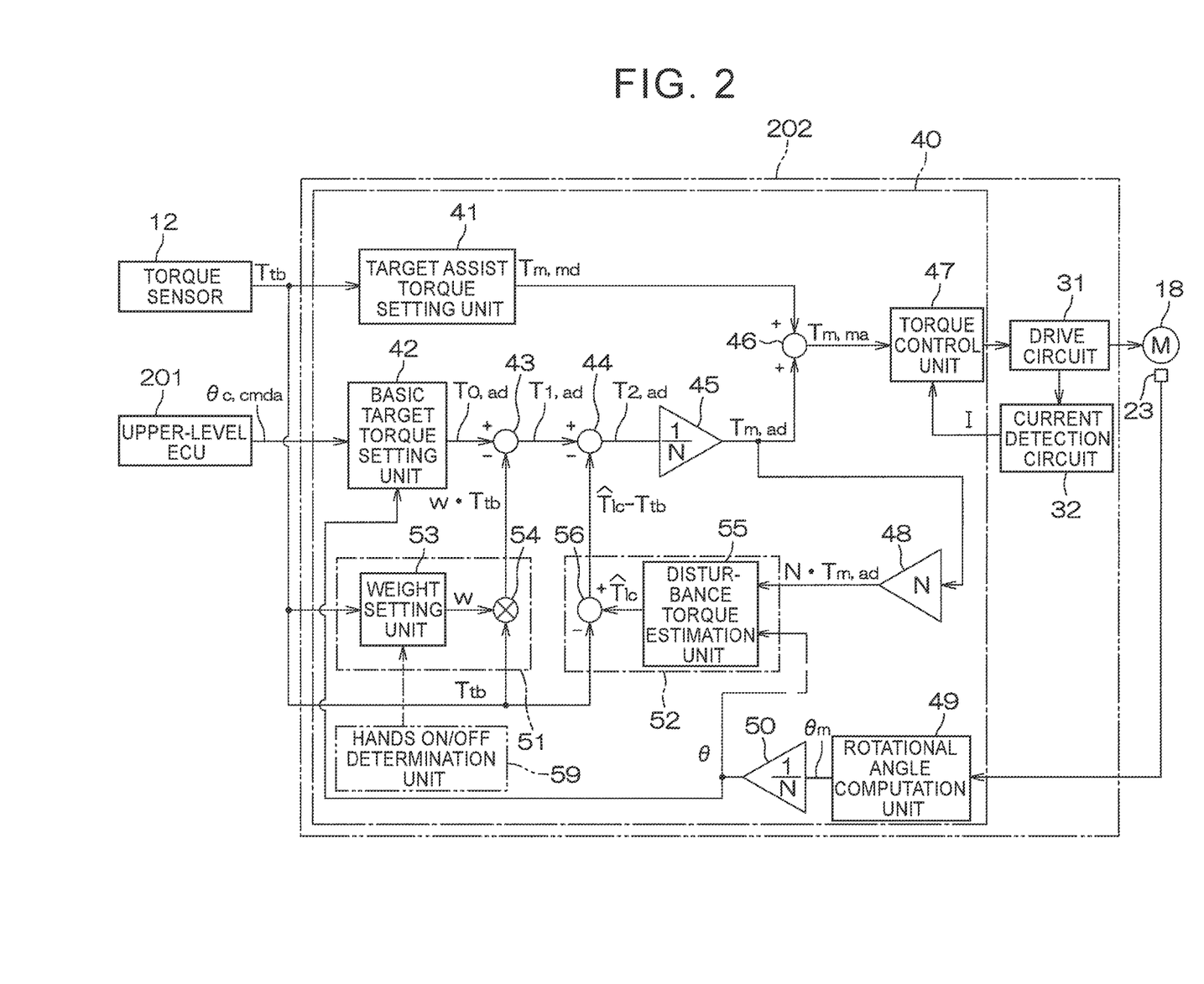
FIG. 2 is a block diagram illustrating the electric configuration of a motor control ECU.

FIG. 2 is a block diagram illustrating the electric configuration of the motor control ECU 202. The motor control ECU 202 includes a microcomputer 40, a drive circuit (inverter circuit) 31 controlled by the microcomputer 40 so as to supply electric power to the electric motor 18, and a current detection circuit 32 that detects a current (hereinafter referred to as a "motor current I") that flows through the electric motor 18.

The microcomputer 40 includes a CPU and a memory (such as a ROM, a RAM, and a non-volatile memory), and executes a predetermined program to function as a plurality of function processing units. The plurality of function processing units include a target assist torque setting unit 41, a basic target torque setting unit 42, a first correction unit 43, a second correction unit 44, a first speed reduction ratio division unit 45, an integral torque computation unit 46, a torque control unit 47, a speed reduction ratio multiplication unit 48, a rotational angle computation unit 49, a second speed reduction ratio division unit 50, a first compensation value computation unit 51, and a second compensation value computation unit 52.

Figure 3:
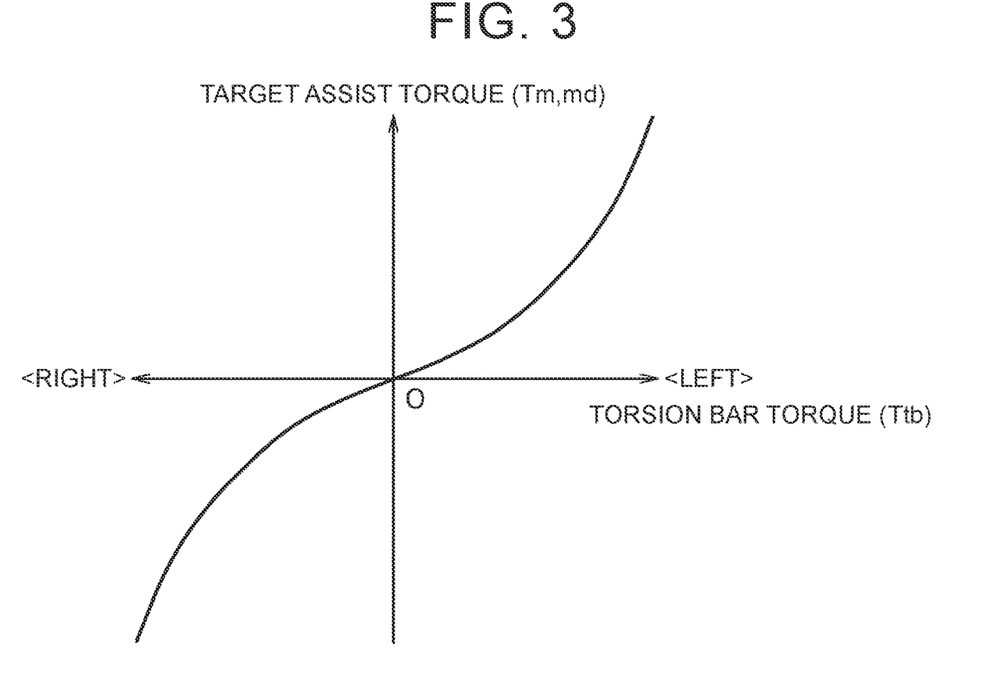
FIG. 3 is a graph illustrating an example of target assist torque $T_{m,md}$ set with respect to torsion bar torque $T_{tb}$.

The target assist torque setting unit 41 sets target assist torque (assist control amount) $T_{m,md}$ which is a target value for assist torque required for manual steering. The target assist torque setting unit 41 sets the target assist torque $T_{m,md}$ based on the torsion bar torque $T_{tb}$ which is detected by the torque sensor 12. An example of the target assist torque $T_{m,md}$ set with respect to the torsion bar torque $T_{tb}$ is illustrated in FIG. 3.

When the torsion bar torque $T_{tb}$ has a positive value, the target assist torque $T_{m,md}$ is positive, and causes the electric motor 18 to generate a steering assist force for leftward steering. When the torsion bar torque $T_{tb}$ has a negative value, meanwhile, the target assist torque $T_{m,md}$ is negative, and causes the electric motor 18 to generate a steering assist force for rightward steering. The target assist torque $T_{m,md}$ is set such that the absolute value thereof becomes larger as the absolute value of the torsion bar torque $T_{tb}$ becomes larger.

The target assist torque setting unit 41 may compute the target assist torque $T_{m,md}$ by multiplying the torsion bar torque $T_{tb}$ by a constant set in advance. Returning to FIG. 2, the rotational angle computation unit 49 computes a rotor rotational angle $\theta_m$ of the electric motor 18 based on an output signal from the rotational angle sensor 23. The second speed reduction ratio division unit 50 converts the rotor rotational angle $\theta_m$, which is computed by the rotational angle computation unit 49, into a rotational angle (actual steering angle) $\theta$ of the output shaft 9 by dividing the rotor rotational angle $\theta_m$ by the speed reduction ratio N.

The basic target torque setting unit 42 sets basic target torque $\theta_{0,ad}$, which is required for automatic steering, using the target automatic steering angle $\theta_{c,cmda}$, which is provided from the upper-level ECU 201, and the actual steering angle $\theta$. Specifically, the basic target torque setting unit 42 computes the basic target torque $T_{0,ad}$ by performing proportional-derivative computation (PD computation) on a deviation $\Delta\theta$ ($=\theta_{c,cmda}-\theta$) between the target automatic steering angle $\theta_{c,cmda}$ and the actual steering angle $\theta$.

The first correction unit 43 subtracts a first compensation value $w \cdot T_{tb}$, which is computed by the first compensation value computation unit 51, from the basic target torque $T_{0,ad}$. The symbol "w" indicates a weight. Consequently, it is possible to obtain first basic target torque $T_{1,ad}$ (torque for the output shaft 9) in which at least a part of the torsion bar torque $T_{tb}$ included in the disturbance torque $T_{lc}$ has been compensated for. The first compensation value computation unit 51 will be discussed later.

The second correction unit 44 subtracts a second compensation value ($\hat{T}_{lc}-T_{tb}$), which is computed by the second compensation value computation unit 52, from the first basic target torque $T_{1,ad}$. Consequently, it is possible to obtain second basic target torque $T_{2,ad}$ (torque for the output shaft 9) in which the disturbance torque $T_{lc}$ excluding the torsion bar torque $T_{tb}$ has been compensated for. The second compensation value computation unit 52 will be discussed later. In this embodiment, the first correction unit 43 and the second correction unit 44 constitute a "correction unit" according to the disclosure.

The first speed reduction ratio division unit 45 computes target automatic steering torque $T_{m,ad}$ (target torque for the electric motor 18) by dividing the second basic target torque $T_{2,ad}$ by the speed reduction ratio N. The integral torque computation unit 46 computes target integral torque $T_{m,ma}$ by adding the target automatic steering torque $T_{m,ad}$ to the target assist torque $T_{m,md}$.

The torque control unit 47 drives the drive circuit 31 such that motor torque of the electric motor 18 is brought closer to the target integral torque $T_{m,ma}$. The torque control unit 47 will be discussed in detail later. The speed reduction ratio multiplication unit 48 converts the target automatic steering torque $T_{m,ad}$ into target automatic output shaft torque $N \cdot T_{m,ad}$, which acts on the output shaft 9 (worm wheel 21), by multiplying the target automatic steering torque $T_{m,ad}$, which is computed by the first speed reduction ratio division unit 45, by the speed reduction ratio N.

The first compensation value computation unit 51 is composed of a weight setting unit 53 and a weight multiplication unit 54. The weight multiplication unit 54 computes the first compensation value $w \cdot T_{tb}$ by multiplying the torsion bar torque $T_{tb}$ by the weight w which is set by the weight setting unit 53. The weight w has a value of 0 or more and 1 or less. The weight setting unit 53 basically sets the weight w to a relatively large value when it is not desirable that the driver should intervene in steering, and sets the weight w to a relatively small value when it is desirable that the driver should intervene in steering. In this embodiment, the weight setting unit 53 sets the weight w to 1, for example, when the absolute value of the torsion bar torque $T_{tb}$ is less than a predetermined value $\alpha$ and the driver has little intention to intervene in steering, and sets the weight w to 0, for example, when the absolute value of the torsion bar torque $T_{tb}$ is equal to or more than the predetermined value $\alpha$ and the driver has a great intention to intervene in steering.

The weight setting unit 53 may set the weight w in accordance with whether the driver is grasping or has released the steering wheel 2. Specifically, a hands on/off determination unit 59 that determines whether the driver is grasping or has released the steering wheel 2 is provided as indicated by the long dashed double-short dashed line in FIG. 2. Then, the weight setting unit 53 sets the weight to 1 when the driver has released the steering wheel 2 (at the time of hands off), and sets the weight to 0 when the driver is grasping the steering wheel 2 (at the time of hands on).

The hands on/off determination unit 59 may determine whether the driver is grasping or has released the steering wheel 2 based on an output signal from a touch sensor (not illustrated) provided to the steering wheel 2, determine whether the driver is grasping or has released the steering wheel 2 based on an image captured by a camera (not illustrated) provided in the vehicle, etc. The hands on/off determination unit 59 may be configured otherwise than discussed earlier as long as the hands on/off determination unit 59 can determine whether the driver is grasping or has released the steering wheel 2.

Further, the weight setting unit 53 may set the weight w to 1 in order not to allow the driver to intervene in steering at the time of an emergency, or may set the weight w to 0.5 in order to enable both automatic steering and manual steering. The second compensation value computation unit 52 is composed of a disturbance torque estimation unit 55 and a subtraction unit 56. The disturbance torque estimation unit 55 estimates the disturbance torque $T_{lc}$ based on the target automatic output shaft torque $N \cdot T_{m,ad}$, which is computed by the speed reduction ratio multiplication unit 48, and the actual steering angle θ, which is computed by the second speed reduction ratio division unit 50. An estimated value of the disturbance torque $T_{lc}$ is represented by $\hat{T}_{lC}$. The subtraction unit 56 computes the second compensation value ($\hat{T}_{lC} - T_{tb}$) by subtracting the torsion bar torque $T_{tb}$ from the estimated disturbance torque value $\hat{T}_{lC}$.

The disturbance torque estimation unit 55 will be described in detail. The disturbance torque estimation unit 55 is constituted of a disturbance observer that computes the estimated disturbance torque value $\hat{T}_{lC}$, an estimated actual steering angle value $\hat{\theta}$, and an estimated angular speed value dθ̂/dt using a physical model 101 of the electric power steering system 1 illustrated in FIG. 4, for example. The physical model 101 includes a plant (an example of an object to be driven by the motor) 102 that includes the output shaft 9 and the worm wheel 21 which is fixed to the output shaft 9. The plant 102 is provided with the torsion bar torque $T_{tb}$ which is torsional torque of the torsion bar 10, and with the road surface load torque $T_{rl}$ from the steered wheels 3 side. The plant 102 is further provided with the target automatic output shaft torque $N \cdot T_{m,ad}$ from the motor via the worm gear 20, and with the friction torque $T_f$ through friction between the worm wheel 21 and the worm gear 20.

Figure 4:
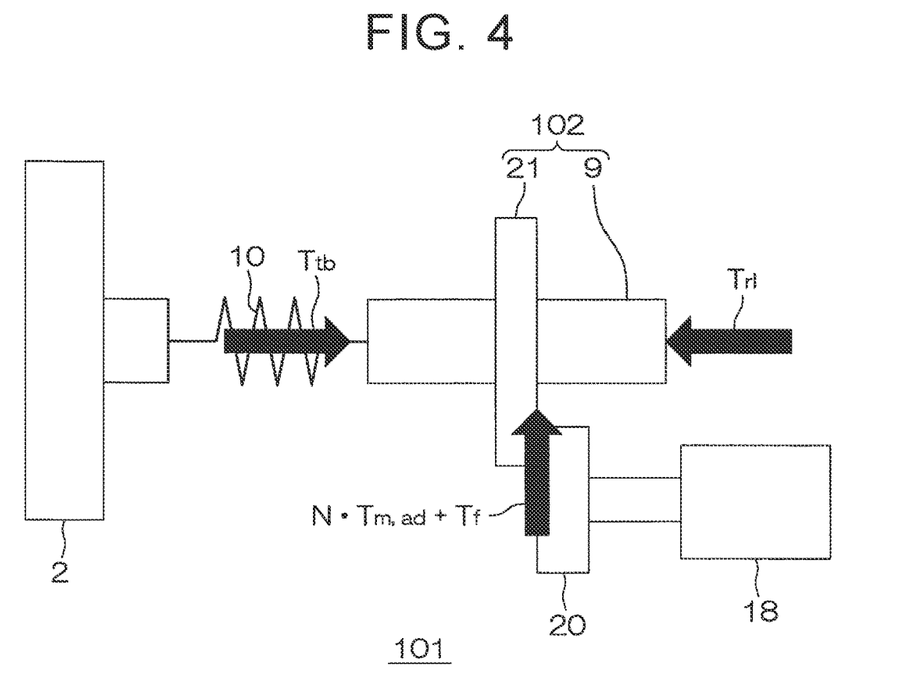
FIG. 4 is a schematic diagram illustrating an example of the configuration of a physical model of the electric power steering system.

When the inertia of the plant 102 is defined as J, the equation of motion for the inertia of the physical model 101 is represented by the following formula (1).

$$J\ddot{\theta} = N \cdot T_{m,ad} + T^{lc}$$

$$T_{lc} = T^{tb} + T^{rl} + T_f \quad (1)$$

$d^2\theta/dt^2$ is the angular acceleration of the plant 102. N is the speed reduction ratio of the speed reducer 19. $T_{lc}$ indicates the disturbance torque which is provided to the plant 102. In this embodiment, the disturbance torque $T_{lc}$ is indicated as the sum of the torsion bar torque $T_{tb}$, the road surface load torque $T_{rl}$, and the friction torque $T_f$. In reality, however, the disturbance torque $T_{lc}$ includes torque other than such torques.

The equation of state for the physical model 101 in FIG. 4 is represented by the following formula (2).

$$\begin{cases} \dot{x} = Ax + B_1 u_1 + B_2 u_2 \\ y = Cx + Du_1 \end{cases} \quad (2)$$

In the formula (2), x is a state variable vector, $u_1$ is a known input vector, $u_2$ is an unknown input vector, and y is an output vector. In the formula (2), in addition, A is a system matrix, $B_1$ is a first input matrix, $B_2$ is a second input matrix, C is an output matrix, and D is a direct matrix. The above equation of state is extended to a system that includes the unknown input vector $u_2$ as one state. The equation of state for the extended system (extended equation of state) is represented by the following formula (3).

$$\begin{cases} \dot{x}_e = A_e x_e + B_e u_1 \\ y = C_e x_e \end{cases} \quad (3)$$

In the formula (3), $x_e$ is a state variable vector for the extended system, and is represented by the following formula (4).

$$x_e = \begin{bmatrix} x \\ u_2 \end{bmatrix} \quad (4)$$

In the formula (3), $A_e$ is a system matrix for the extended system, $B_e$ is a known input matrix for the extended system, and $C_e$ is an output matrix for the extended system. A disturbance observer (extended state observer) represented by the following formula (5) is constructed from the extended equation of state of the formula (3).

$$\begin{cases} \dot{\hat{x}}_e = A_e \hat{x}_e + B_e u_1 + L(y - \hat{y}) \\ \hat{y} = C_e \hat{x}_e \end{cases} \quad (5)$$

In the formula (5), $\hat{x}_e$ represents an estimated value of $x_e$. L is an observer gain. $\hat{y}$ represents an estimated value of y. $\hat{x}_e$ is represented by the following formula (6).

$$\hat{x}_e = \begin{bmatrix} \hat{\theta} \\ \dot{\hat{\theta}} \\ \hat{T}_{lc} \end{bmatrix} \quad (6)$$

Figure 5:
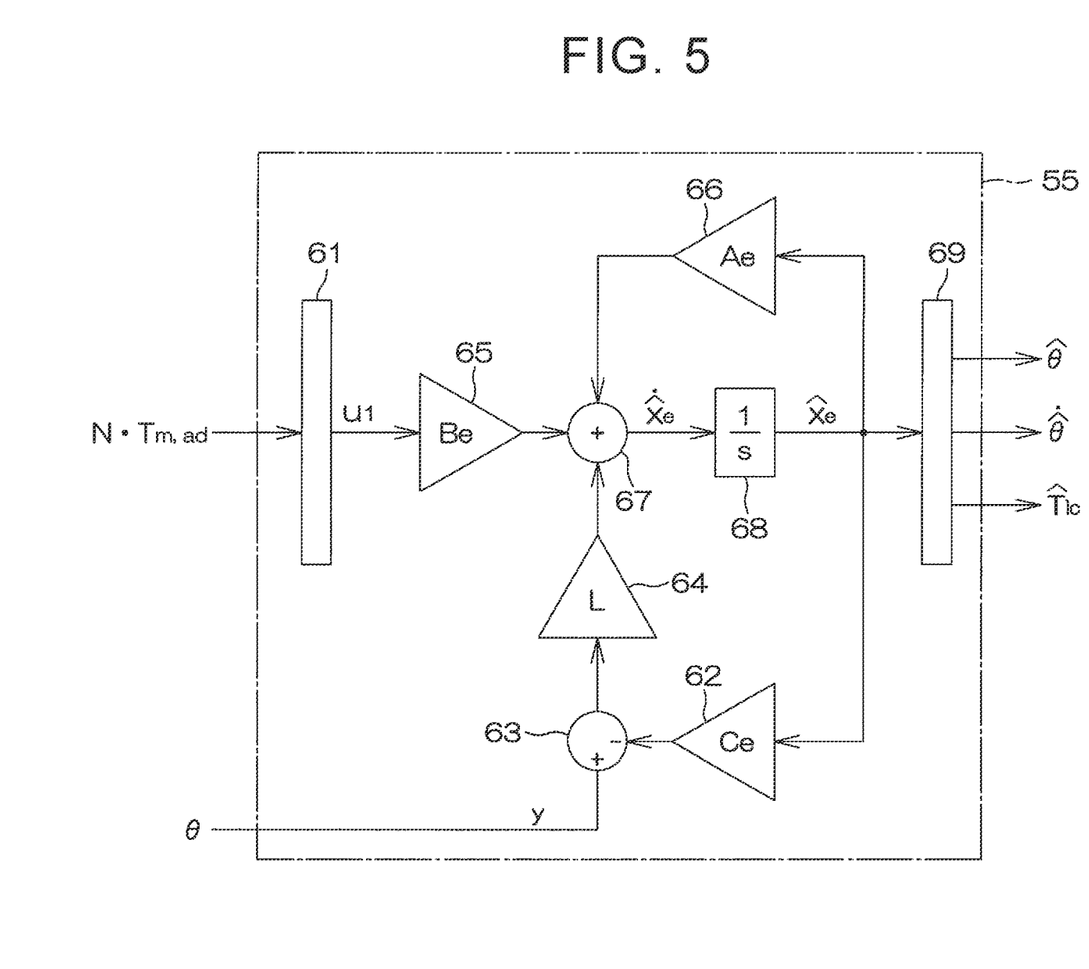
FIG. 5 is a block diagram illustrating the configuration of a disturbance torque estimation unit.

In the formula (6), $\hat{\theta}$ is an estimated value of the actual steering angle θ, dθ̂/dt is an estimated value of the angular speed dθ/dt, and $\hat{T}_{lC}$ is an estimated value of the disturbance torque $T_{lc}$. The disturbance torque estimation unit 55 computes the state variable vector $\hat{x}_e$ based on the equation of the formula (5). FIG. 5 is a block diagram illustrating the configuration of the disturbance torque estimation unit 55.

The disturbance torque estimation unit 55 includes an input vector input unit 61, an output matrix multiplication unit 62, a first addition unit 63, a gain multiplication unit 64, an input matrix multiplication unit 65, a system matrix multiplication unit 66, a second addition unit 67, an integration unit 68, and a state variable vector output unit 69. The target automatic output shaft torque $N \cdot T_{m,ad}$, which is computed by the speed reduction ratio multiplication unit 48 (see FIG. 2), is provided to the input vector input unit 61. The input vector input unit 61 outputs the input vector $u_1$ to the input matrix multiplication unit 65. The target integral torque (target torque) $T_{m,ma}$, which is computed by the integral torque computation unit 46, may be used in place of the target automatic output shaft torque $N \cdot T_{m,ad}$.

The output from the integration unit 68 is the state variable vector $\hat{x}_e$ (see the formula (6)). When the computation is started, an initial value of the state variable vector $\hat{x}_e$ is provided. The initial value of the state variable vector $\hat{x}_e$ is 0, for example. The system matrix multiplication unit 66 multiplies the state variable vector $\hat{x}_e$ by the system matrix $A_e$. The output matrix multiplication unit 62 multiplies the state variable vector $\hat{x}_e$ by the output matrix $C_e$.

The first addition unit 63 subtracts the output ($Ce \cdot \hat{x}_e$) from the output matrix multiplication unit 62 from the output vector y which is the actual steering angle θ. That is, the first addition unit 63 computes the difference (y−ŷ) between the output vector y and the estimated output vector value ŷ (=$C_e \cdot \hat{x}_e$). The gain multiplication unit 64 multiplies the output (y−ŷ) from the first addition unit 63 by the observer gain L (see the formula (5)). The input matrix multiplication unit 65 multiplies the input vector $u_1$, which is output from the input vector input unit 61, by the input matrix $B_e$. The second addition unit 67 computes a differential value $d\hat{x}_e/dt$ of the state variable vector by adding the output ($B_e \cdot u_1$) from the input matrix multiplication unit 65, the output ($A_e \cdot \hat{x}_e$) from the system matrix multiplication unit 66, and the output (L(y−ŷ)) from the gain multiplication unit 64. The integration unit 68 computes the state variable vector $\hat{x}_e$ by integrating the output ($d\hat{x}_e/dt$) from the second addition unit 67. The state variable vector output unit 69 computes the estimated disturbance torque value $\hat{T}_{lC}$ the estimated actual steering angle value $\hat{\theta}$, and the estimated angular speed value $d\hat{\theta}/dt$ based on the state variable vector $\hat{x}_e$.

A disturbance observer constituted of an inverse model of the plant and a low-pass filter may be used in place of the extended state observer discussed earlier. In this case, the equation of motion of the plant is represented by the formula (1) as discussed earlier. Thus, the inverse model of the plant is as indicated by the following formula (7).

$$T_{lc} = J\ddot{\theta} - {}^nN \cdot T_{m,ad} \tag{7}$$

An input to the disturbance observer which uses the inverse model of the plant is $J \cdot d^2\theta/dt^2$ and $N \cdot T_{m,ad}$ and uses a second-order differential value of the actual steering angle θ, and therefore is significantly affected by noise of the rotational angle sensor 23. With the extended state observer discussed earlier, in contrast, disturbance torque is estimated through integration, and therefore the effect of noise due to differentiation can be advantageously reduced. Next, the torque control unit 47 in FIG. 2 will be described.

Figure 6:
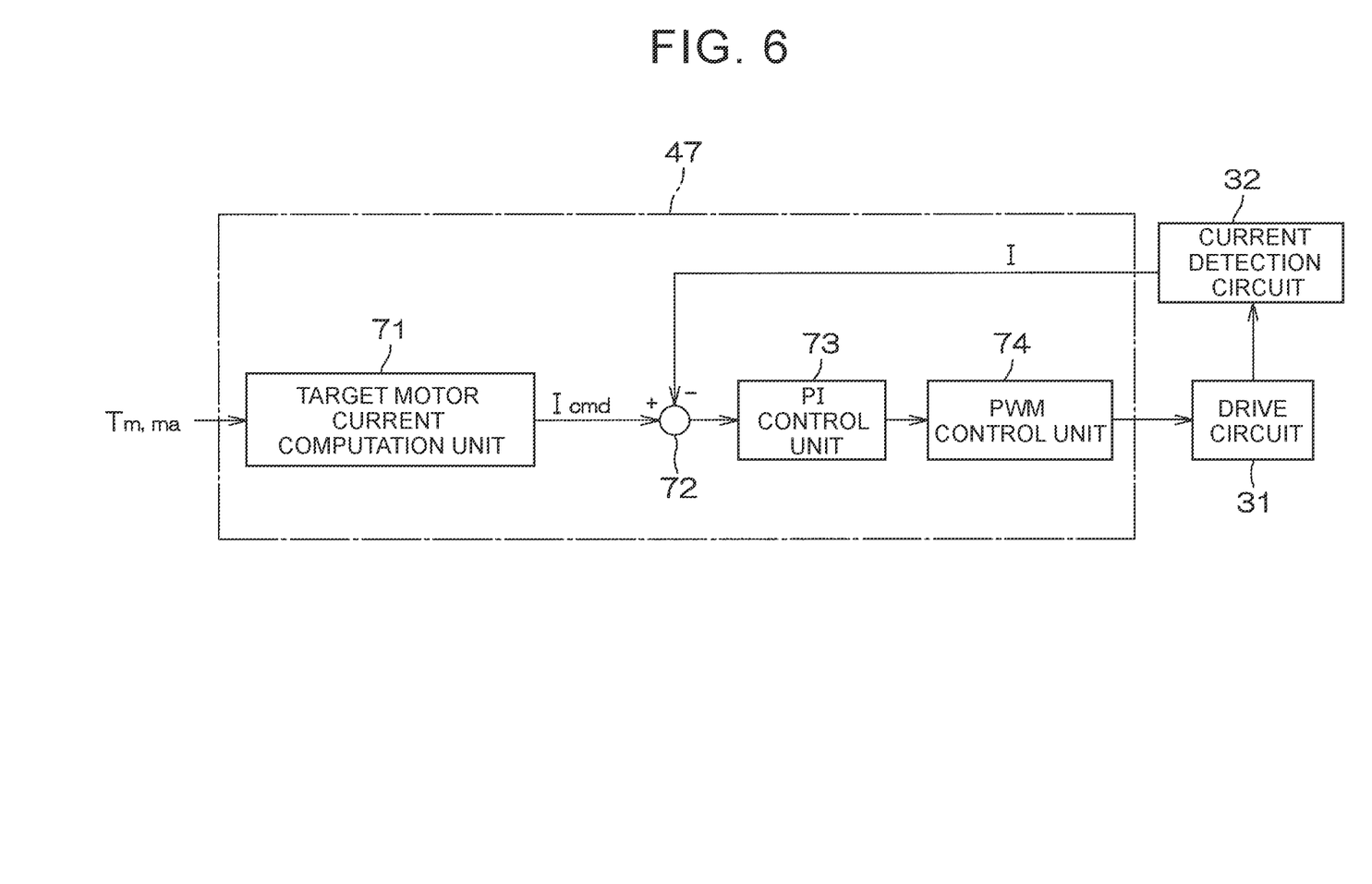
FIG. 6 is a block diagram illustrating the configuration of a torque control unit.

FIG. 6 is a block diagram illustrating the configuration of the torque control unit 47. The torque control unit 47 includes a target motor current computation unit 71, a current deviation computation unit 72, a PI control unit 73, and a pulse width modulation (PWM) control unit 74. The target motor current computation unit 71 computes a target motor current $I_{cmd}$ by dividing the target integral torque $T_{m,ma}$, which is computed by the integral torque computation unit 46 (see FIG. 2), by a torque constant Kt of the electric motor 18.

The current deviation computation unit 72 computes a deviation ΔI (=$I_{cmd}$−I) between the target motor current $I_{cmd}$, which is obtained by the target motor current computation unit 71, and the motor current I, which is detected by the current detection circuit 32. The PI control unit 73 performs proportional-integral computation (PI computation) on the current deviation ΔI, which is computed by the current deviation computation unit 72, to generate a drive command value for bringing the motor current I, which flows through the electric motor 18, closer to the target motor current $I_{cmd}$. The PWM control unit 74 generates a PWM control signal with a duty ratio corresponding to the drive command value, and supplies the generated PWM control signal to the drive circuit 31. Consequently, electric power corresponding to the drive command value is supplied to the electric motor 18.

In the embodiment discussed earlier, an estimated value of the disturbance torque $T_{lc}$ excluding the torsion bar torque $T_{tb}$ is computed, as it is, as the second compensation value ($\hat{T}_{lC} - T_{tb}$), and always used as a compensation value for the basic target torque $T_{0,ad}$ (see the second compensation value computation unit 52 and the second correction unit 44 in FIG. 2). Consequently, a reduction in the lane keeping performance during automatic steering due to the disturbance torque can be suppressed.

For the torsion bar torque $T_{tb}$ as the steering torque applied to the steering system, on the other hand, a value obtained by multiplying the torsion bar torque $T_{tb}$ by the weight w is computed as the first compensation value ($w \cdot T_{tb}$) (see the first compensation value computation unit 51 and the first correction unit 43 in FIG. 2). Consequently, suitable tactile information can be provided to the driver. In other words, a human machine interface (HMI) function can be implemented.

For example, control in which priority is given to the system and inputs by the driver are ignored is achieved in the case where the steering torque, as it is, is compensated for (w=1), and control in which inputs by the driver are received is achieved in the case where the steering torque, as it is, is not compensated for (w<1). That is, the degree of priority given to the system and the driver can be changed by adjusting the weight w, which enables cooperation between a human (driver) and the system.

While an embodiment of the disclosure has been described above, the disclosure may be implemented in other embodiments. For example, in the embodiment discussed earlier, the torsion bar torque $T_{tb}$ which is detected by the torque sensor 12 is used as steering torque. However, driver torque applied to the steering wheel 2 may be estimated, and the estimated driver torque may be used as the steering torque.

In the case where the estimated steering torque is used, in addition, three computed values, namely the actual steering angle θ, the target automatic output shaft torque $N \cdot T_{m,ad}$, and the torsion bar torque $T_{tb}$, may be used as inputs, and two compensation values, namely the first compensation value and the second compensation value, may be estimated using one observer. In the embodiment discussed earlier, in addition, the disclosure is applied to motor control for an EPS of a column type. However, the disclosure is also applicable to motor control for EPSs other than the column type. In addition, the disclosure is also applicable to control for electric motors for steered angle control for a steer-by-wire system.

Besides, the disclosure can be subjected to a variety of design changes without departing from the scope of the claims.

What is claimed is:

1. An electric power steering system comprising: an electric motor configured to apply motor torque to a steering system; a rotational angle detection unit configured to detect a rotational angle of the electric motor; a current detection circuit configured to detect a motor current that flows through the electric motor; a steering torque detection unit configured to detect or estimate steering torque applied to the steering system; a target torque setting unit configured to set target torque for the electric motor based on an automatic steering angle command value; a current command value setting unit configured to set a current command value corresponding to the target torque; and a current control unit configured to cause the motor current to follow the current command value, wherein: the target torque setting unit includes a basic target torque setting unit, a first compensation value computation unit, a second compensation value computation unit, and a correction unit; the basic target torque setting unit is configured to set basic target torque for the electric motor such that the rotational angle of the electric motor follows the automatic steering angle command value; the first compensation value computation unit is configured to set a first compensation value based on the steering torque; the second compensation value computation unit is configured to compute a second compensation value either based on the motor torque, the rotational angle, and the steering torque, or based on the target torque, the rotational angle, and the steering torque, the second compensation value being an estimated value of disturbance torque other than the steering torque that acts on the steering system; the correction unit is configured to correct the basic target torque using the first compensation value and the second compensation value; a second compensation value based on the motor torque, the rotational angle, and the steering torque or a second compensation value based on the target torque, the rotational angle, and the steering torque.

2. The electric power steering system according to claim 1, wherein the first compensation value computation unit includes a weight setting unit that sets a weight and a multiplication unit that computes the first compensation value by multiplying the steering torque by the weight.

\* \* \* \* \*